United States Patent [19]

Lamore

[11] Patent Number: 4,827,561

[45] Date of Patent: May 9, 1989

[54] PORTABLE TACKING SYSTEM

[76] Inventor: Patrick H. Lamore, 2577 Belle View Dr., Rochester, Mich. 48064

[21] Appl. No.: 66,972

[22] Filed: Jun. 29, 1987

[51] Int. Cl.⁴ .............................................. G06F 15/46

[52] U.S. Cl. ................................ 15/327 R; 15/53 A; 15/234; 15/383

[58] Field of Search ...................... 15/377, 327 R, 230, 15/383, 53 A, 53 AB, 234

[56] References Cited

U.S. PATENT DOCUMENTS 1,325,296 12/1919 Kern ................................ 15/383 X 1,642,440 9/1927 Hoe et al. ............................. 15/328

4,689,749 8/1987 Glogowski ........................ 15/53 AB

FOREIGN PATENT DOCUMENTS 503630 7/1930 Fed. Rep. of Germany ........ 15/377

*Primary Examiner*—Chris K. Moore

*Attorney, Agent, or Firm*—Krass & Young

[57] ABSTRACT

A portable tacking unit includes a hand-held tacking head having a cylindrical brush operatively communicating with a central suction unit via a flexible conduit. The unit is readily adapted to electrostatically attract and remove fine dust particles from surfaces prior to painting, lacquering or coating thereof.

17 Claims, 2 Drawing Sheets

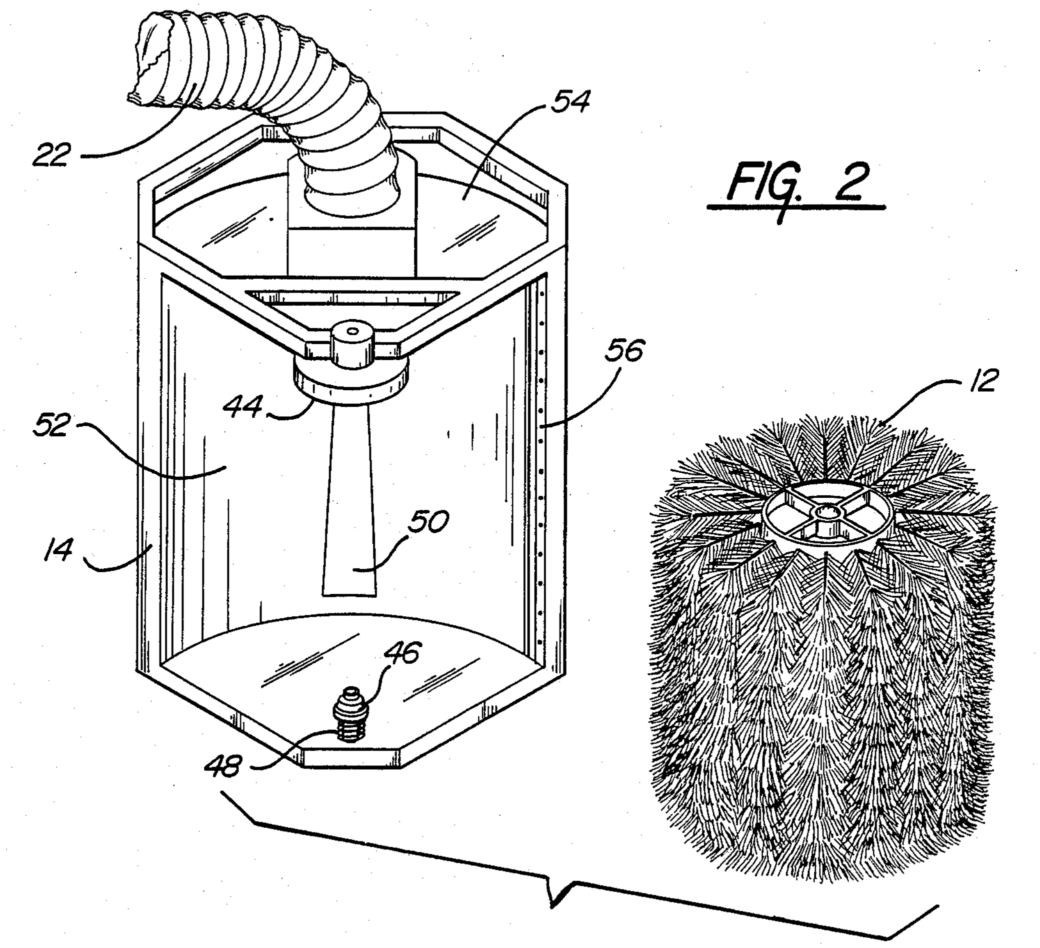
FIG. 2
FIG. 3
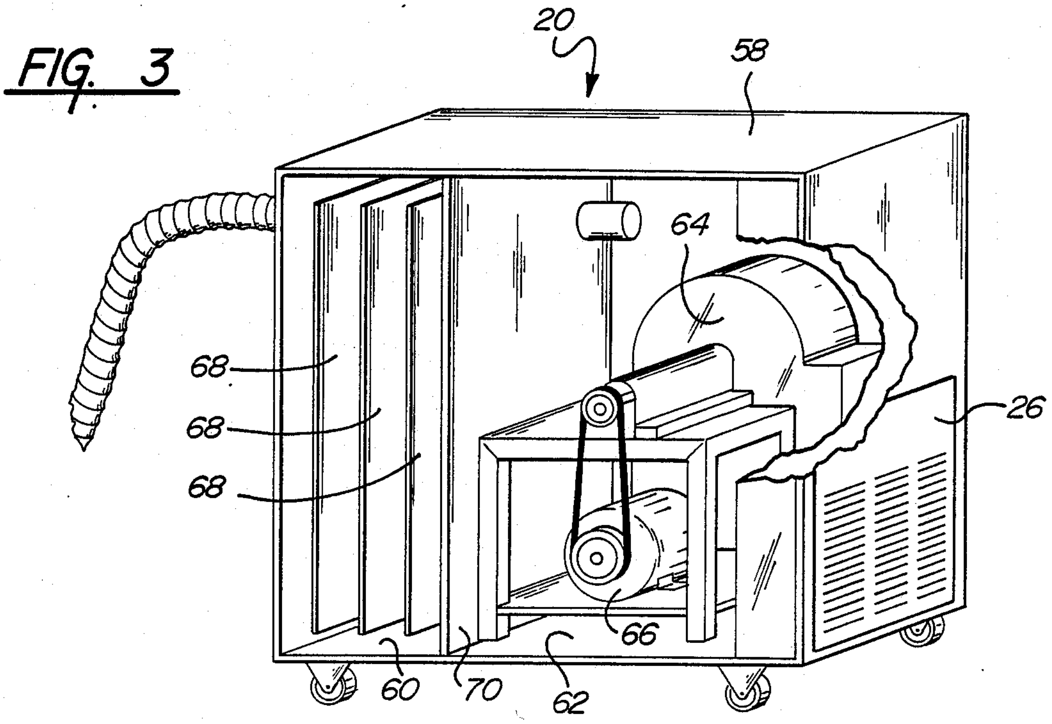

PORTABLE TACKING SYSTEM

FIELD OF THE INVENTION

This invention relates generally to cleaning apparatus for the removal of dust, lint and other particulate matter from surfaces prior to the painting, lacquering or other coating thereof. In particular, the present invention relates to a portable tacking unit having a head adapted for hand-held operation.

BACKGROUND OF THE INVENTION

Removal of dust, lint or other particulate contaminants is very important in processes for painting, lacquering or otherwise coating articles insofar as such particles will form blemishes in the final coated product. Attempts at dust removal by wiping are frequently counterproductive because contact with cloths and the like can introduce further contamination in the form of lint or extraneous matter. It has been found in many instances that brushes may be employed to remove dust or other fine particulate matter from a surface prior to coating and such brushes are referred to as tack brushes.

Brushes most advantageously employed in a tacking process are those which are prone to develop and maintain a static electrical charge thereupon. A charged brush will attract and hold dust particles rather than scattering them around the surface or the workplace. In addition to developing a static charge, it is desirable that a tack brush be capable of rapidly discharging so as to enable release of the collected dust Discharge is typically accomplished by the use of an ion generator such as a radioactive or electrically charged member.

Of particular advantage in fabrication of tack brushes are feathers, particularly the feathers of ratite birds such as ostriches or emus. Such feathers rapidly develop a static electrical charge and readily discharge when subjected to an appropriate ion source. Other types of feathers, including synthetic substitutes, may be similarly employed in the fabrication of tack brushes.

Heretofore available tacking apparatus have been relatively large pieces of equipment generally comprised of a plurality of power driven brushes, each brush being several feet in diameter and 4–10 feet long. The brushes are typically mounted in a fixed location and articles being tacked passed thereunder. For example, in the preparation of automobile bodies for painting, a tacking apparatus comprised of a plurality of rollers analogous to a carwash is utilized to provide a final dust removal treatment. Such large apparatus work well for high volume cleaning of relatively large area items. However, there is an unaddressed need for apparatus adapted for the tacking of small size and/or low production volume items.

For example, household appliances, burial caskets, furniture and pianos are all generally provided with high quality painted and/or lacquered finishes. However, a large area tacking apparatus would not be well suited for preparation of these items for coating owing to their small size and/or relatively complex shape. Similarly, automobile repair shops need to prepare portions of automobiles for painting. However, it would not be cost effective to employ a large area high volume tacking apparatus for such preparation. Heretofore in such situations, final cleaning of an item prior to counting thereof was accomplished by the use of wiping cloths or feather dusters. However, such items, are prone to deposit new lint particles and to scatter existing dust about, creating more problems than they solve.

Accordingly, it will be seen that there is a need for a relatively small area tacking apparatus suited for low volume and/or small area applications. It is preferred that such apparatus be capable of operation by a single worker and be readily adapted to tacking of surfaces of a variety of shapes. It is further desired that such apparatus be capable of collecting and retaining dust particles as opposed to scattering them about.

The present invention addresses this heretofore unfulfilled need by providing a portable tacking apparatus suited for hand-held operation by a single worker. The tacking apparatus of the present invention includes a portable, relatively lightweight tacking head which an operator may sweep across a surface prior to painting. T he tacking head communicates with a central suction unit adapted to retain dust particles collected by the tacking head. These and other advantages of the present invention will be readily apparent from the drawings, description and claims which follow.

BRIEF DESCRIPTION OF THE INVENTION

There is disclosed herein a portable tacking unit comprising a tacking head having a cylindrical brush rotatably supported in a housing such that a major portion of the circumference of the brush is exposed and a minor portion thereof is surrounded by the housing. The housing also includes an exhaust port disposed proximate the minor portion of the brush and adapted to withdraw ambient air therefrom. The tacking unit further comprises a central suction unit adapted to provide a flow of air at pressures less than atmospheric and a flexible conduit operatively connecting the exhaust port to the suction unit such that a low pressure flow of air is established from said exhaust port to the central suction unit.

In a particular embodiment, the brush is a cylindrical brush comprising a rigid inner core having a plurality of feathers, such a ratite feathers, affixed thereto. In one embodiment the brush is approximately 5–72 inches in length and approximately 5–24 inches in width. The housing may include drive means such as an electric motor or a flexible shaft for rotating the brush. The power for accomplishing this rotation may be provided by the central suction unit as for example via an electrical connection or by disposing a flexible shaft in operative communication with .an electric motor in the central suction unit and the brush. The electrical connection or the flexible shaft may be disposed so as to pass through the flexible conduit.

The brush may be adapted to generate a static electrical charge in use so as to attract and retain dust particles thereupon and the housing may further include an ion generator associated therewith and adapted to discharge the static electrical charge from the brush so as to facilitate the release of dust particles attracted thereto. In a particular instance, the housing may be adapted to expose at least 270° of the circumference of the brush. The central suction unit may be adapted to operate in cooperation with the exhaust port and the flexible conduit so as to withdraw dust particles from the brush and the unit may further be adapted to collect the dust particles as for example by the use of filters.

The apparatus may further include a tacking head holder adapted to support the tacking head when it is not in use. This holder may be configured to receive and surround the major portion of the circumference of the brush when the tacking head is supported therein.

BRIEF DESCRIPTION OF THE DRAWINGS

FIG. 2 is a perspective view of the tacking head housing showing the brush as removed therefrom; and FIG. 3 is a cutaway view in perspective of the central suction unit illustrating the components thereof.

DETAILED DESCRIPTION OF THE INVENTION

Figure 1:
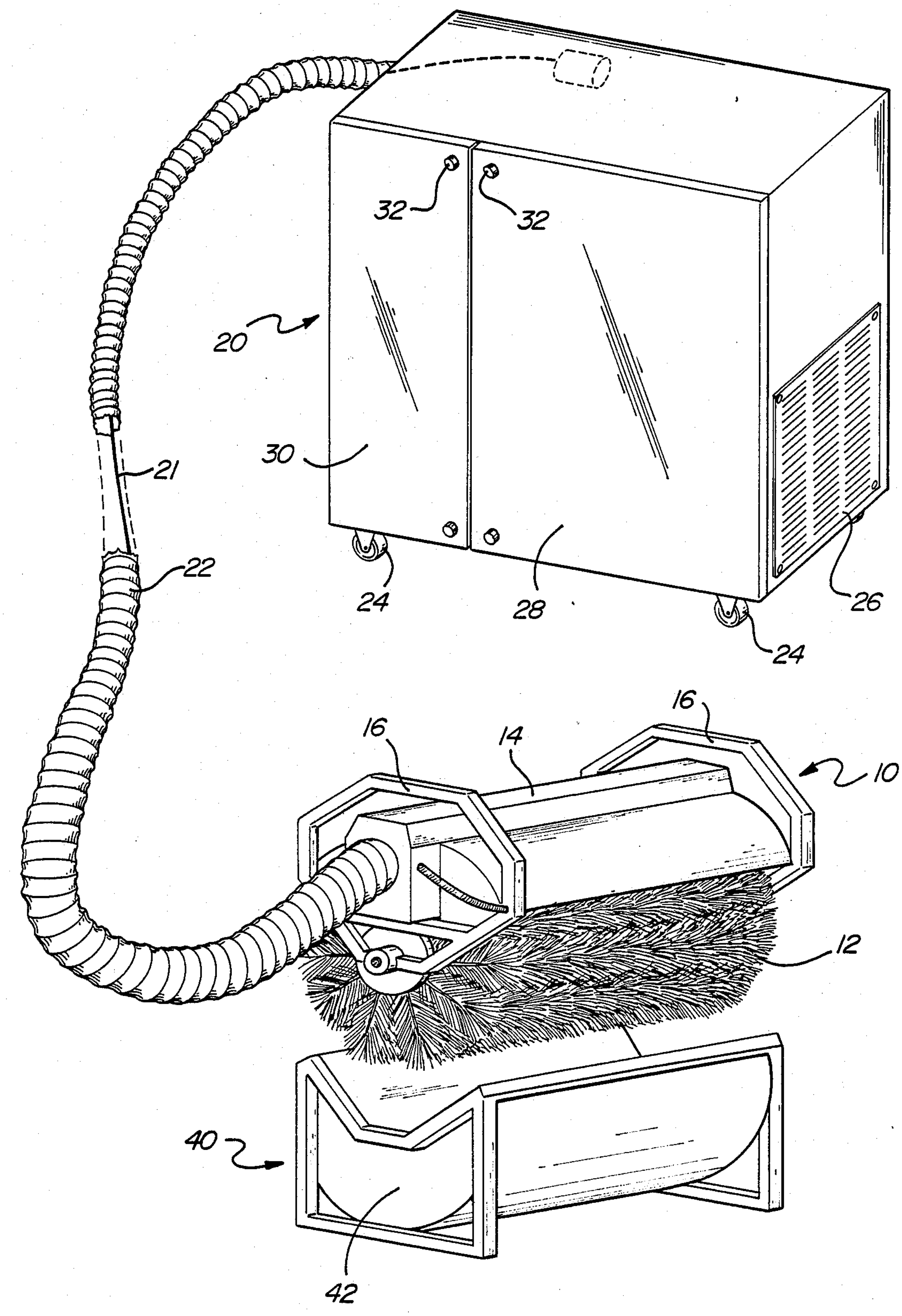
FIG. 1 is a perspective view of one tacking unit structured in accord with the principles of the present invention and depicting a central suction unit, flexible conduit, tacking head and tacking head holder.

Referring now to FIG. 1, there is shown a general depiction of one particular tacking apparatus as structured in accord with the principles of the present invention. As illustrated, the apparatus includes a tacking head 10 comprised of a generally cylindrical brush 12 and a housing 14. The brush 12 is rotatably supported by the housing 14 such that a major portion of the circumference of the brush 12 is exposed and a minor portion thereof is surrounded by the housing 14. It should be noted at this point by "major portion" is meant a portion of the circumference of the brush approximately equal to, or greater than, half of the circumference thereof. Conversely "minor portion" shall refer to a portion of the circumference which is less than the major portion.

The tacking head 10 includes a pair of handles 16 formed on the housing 14 and configured so as to enable ready manipulation thereof by an operator.

The tacking head 10, which will be described in greater detail hereinbelow is operatively connected to a central suction unit 20 by means of a flexible conduit 22, depicted here as a corrugated tube. The central suction unit 20 is adapted to provide a low pressure flow of air therethrough and the conduit 22 operates in cooperation with the central suction unit 20 to exhaust ambient air from the housing 14 of the tacking head 10 to the region proximate the minor portion of the brush 12. As depicted, the conduit 22 is shown with a break therein so as to indicate that it may be of any arbitrary length. In fact, in some embodiments it may be desirable to power a plurality of tacking heads 10 from a single central suction unit 20 by employing a plurality of conduits operatively associated therewith.

The central suction unit 20, which will be described in greater detail hereinbelow, is mounted on casters 24 so as to enable ready maneuverability thereof. The central suction unit includes a discharge port 26 for exhaust of air therefrom and preferably has a filter associated therewith so as to minimize scattering of dust throughout the workplace. It should additionally be appreciated that by disposing the central suction unit remote from the tacking head, scattering of dust is still further minimized. The central suction unit 20 includes a pair of access doors, 28–30 to allow entry to the interior thereof. These doors are fastened with locking hitches such as drawtite latches 32 so as to maintain a positive seal still further preventing egress of dust.

The tacking apparatus of the present invention may also include a tacking head holder 40 configured so as to support the tacking head 10 when it is not in use. The holder 40 may be configured in a variety of shapes and as illustrated herein, includes a covered portion 42 adapted to receive and shield the exposed major portion of the brush 12 when it is not in use.

Referring now to FIG. 2, there is presented a detailed depiction of the housing 14 and the brush 12 which comprise the tacking head. The housing 14 is adapted to rotatably support the brush 12 and toward that end includes a pair of bearing members 44–46 configured so as to allow for the ready insertion and removal of the brush 12 without the need for any tools. The topmost support bearing 44 is depicted as being a fixed support attached to the framework of the housing and including a sleeve adapted to engage the brush 12. The lower support bearing 46 is spring loaded as for example by the inclusion of the helical spring 48 so as to facilitate the ready removal of the brush 12. The upper bearing 44 has associated therewith drive means for rotating the brush 12. Such drive means may take many forms well known to those of skill in the art. For example, the housing 14 may include an electrical motor operatively connected to the upper bearing 44 by a drivebelt for rotation of the brush 12. Power for the motor may be advantageously provided by means of an electrical connection to the central suction unit or by an external electrical connection.

In order to eliminate weight of the housing 14 it has been found expedient to drive the brush 12 by means of a flexible shaft 21 operatively communicating with drive means such as an electrical motor 65 disposed in the central suction unit. The motor 65 is shown in FIG. 3 and in phantom outline in FIG. 1, together with a portion of the flexible shaft 21. In such instances it has been found most advantageous to dispose the flexible shaft 21 within the exhaust conduit 22, and to rotate the upper bearing 44 by a drivebelt communicating with the flexible shaft. Such flexible shaft technology is well known to those of skill in the art and need not be described in further detail herein.

The housing 14 includes an exhaust port 50 disposed so as to remove ambient air from regions proximate the minor portion of the brush 12 retained therein. As depicted, the conduit 22 exhausts air from a rear portion of the housing defined by the front housing wall 52 and the rear housing wall 54. The exhaust port 50 is formed by cutting an opening into the front wall 52 of the housing 14 so as to allow for flow of air into the space from between the two walls 52 and 54. As depicted, the exhaust port 50 is a generally tapering opening which is narrowest closest to the conduit 22 through which exhaust occurs and widest most remote from that conduit. In this manner, a relatively uniform flow of air is maintained through the port 50.

The housing 14 also includes an ion generator 6 disposed along one edge thereof. It is a function of the ion generator to release ions which discharge a static electrical charge resident upon the brush 12 as it is swept therepast. The direction of rotation of the brush 12 and the location of the ion generator 56 are selected so that the brush 12 will be discharged after it is swept across the surface being tacked and before it passes the exhaust port 50. In this manner, particles of dust adherent to the brush 12 will be released so as to enable ready withdrawal through the exhaust port 50. There are a wide variety of ion sources known and available to those of skill in the art all of which may be adapted for use in the present invention. For example, the ion generator 56 may be a radio-isotope containing member. Alternatively, the ion generator 56 may be an electrically charged member such as a Corona discharge wire or the like.

The brush 12 may be of a variety of sizes and shapes depending upon the particular tacking application; generally, for the sake of portability it is anticipated that the brush 12 will be between 5–72 inches in length and/or width. As mentioned previously ratite feathers are particularly favored for tacking applications insofar as they readily generate a static electrical charge and also are easily discharged. There are a variety of such brushes available to those of skill in the art. One such brush is disclosed in U.S. Pat. No. 4,760,620, the disclosure of which is incorporated herein by reference. As disclosed therein, durable tacking brushes may be readily fabricated by a process wherein feathers are inserted into a resilient member, positioned and then affixed with an adhesive compound. In other processes brushes are fabricated by implanting feathers or tufts of material into a predrilled form whereas in still other instances brushes are fabricated by wrapping tufts or feathers onto a central arbor by means of wire or twine. In some instances, as for example in the preparation of electroplated articles, a more rigorous cleaning is required. Such cleaning may be readily accomplished by the apparatus depicted herein by utilizing a harder brush, such as a bristle brush, in place of the feather brushes. In those instances where a bristle brush is employed, it may be advantageous to expose a lesser portion of the brush, as for example a 90 degree portion. Obviously, the present invention is not restricted as to the use of any particular type of brush but may be advantageously practiced in conjunction with all brushes available to those of skill in the art.

Referring now to FIG. 3, there is shown in cutaway view the central suction unit 20 of the present invention. As depicted the unit 20 includes a cabinet 58 having two compartments 60,62 therein. The first compartment 62 is the exhaust compartment and includes a high volume exhaust blower 64 disposed so as to be driven by an electrical motor 66. The exhaust compartment 62 includes a louvered opening 26, communicating with the exterior environment and may optionally include an exhaust filter not shown herein associated with the exhaust louver 26 to limit the spread of dust to the external environment.

The cabinet 58 further includes a filter compartment 60 in operative communication with the exhaust compartment 62 and the flexible conduit 22. The filter compartment 60 includes a plurality of air filters 68 therein for purposes of capturing and retaining dust particles. The filter compartment 60 is separated from the exhaust compartment 62 by a porous wall 70 which supports the filters 68 while allowing air to pass therethrough for exhaust by the blower 64. In this regard, the porous wall 70 may be fabricated from a screen or meshlike member, or may be perforated by a plurality of holes, or in some instances may merely comprise a framework adapted to support the edges of one or more filters. In one preferred embodiment, the filters 68 are high efficiency filters adapted to retain 95% of all particles 0.3 microns in size or larger. Although not illustrated, the central suction unit 20 may further include an electrical motor disposed so as to power a flexible shaft as previously mentioned.

The operation of the tacking apparatus of the present invention will be described with reference to features illustrated in all of the foregoing drawings. In order to prepare a surface for painting, lacquering, or the like the central suction unit 20 of the apparatus of the present invention is energized so as to cause the blower 64 to create a low pressure flow of air therethrough. This low pressure flow of air sweeps from the exhaust port 50 of the housing 14 of the tacking head 10, through the flexible conduit 22, and into the filter chamber 60 wherein the filters 68 trap the entrained dust. The dustfree air stream then passes through the porous wall 70 and out the exhaust louver 26.

Rotation of the brush 12 is accomplished by energizing the flexible shaft or electrical motor as discussed previously thereby rendering the unit operational. In order to prepare a surface for painting, an operator simply has to manually sweep the tacking head 10 across the surface maintaining only very minimal pressure. The feathers of the brush 12 will sweep up and electrostatically retain dust particles as the feathers of the brush pass in near proximity of the ion generator 56 they will become discharged as to readily release their dust particles as they move past the exhaust port 50.

It should be appreciated that various refinements of the present invention may be readily made in accordance therewith, and in light of the teaching herein. For example, it may generally be preferred to limit rotation of the brush to those instances where it is actually being used in a tacking operation and accordingly an on/off switch controlling such rotation may be advantageously deployed upon one of the handles 16 of the tacking head 10. Furthermore, the central suction unit 20 may be further modified in the interest of decreasing its size, improving its efficiency and the like. For example, the central suction unit may be disposed far remote from the site where tacking operations are carried on and in such instance precautions regarding scattering and generation of dust need not be taken. Therefore a conventional vacuum cleaner may be employed as the suction unit. In yet other instances, a simple exhaust blower provided with a filter may be substituted for the central suction unit. In other, large scale applications a plurality of tacking heads may be energized by a single central suction unit via a number of flexible conduits. While the tacking unit disclosed herein has been described as being under direct manual control of an operator, the description of the operator should be interpreted broadly to include robotic operators. For example a general purpose robot may be readily employed to move the tacking head 10 across a surface without undue modification of the head 10 or the robot. In fact, a single head may be interchangeably utilized by human or robotic workers, by providing a coupling upon the housing thereof adapted for connection to a robot arm.

All of the foregoing modifications are within the ability of one of skill in the art and accordingly are within the scope of the present invention. It should be appreciated that the preceding discussion, drawings and description are merely meant to be illustrative of particular embodiments of the present invention and not a limitation upon the practice thereof. It is the following claims, including all equivalents which are meant to define the scope of the present invention.

I claim:

1. A portable tacking unit comprising:

a tacking head including a cylindrical brush, a housing adapted to rotatably support the brush such that a major portion of the circumference of the brush is exposed and a minor portion thereof is surrounded by the housing, said housing further including an exhaust port disposed proximate the minor portion of the brush and adapted to withdraw ambient air therefrom;

a central suction unit adapted to provide a flow of air at pressures less than atmospheric; and a flexible conduit operatively connecting said exhaust port to the suction unit such that a low pressure flow of air is established from said exhaust port to said central suction unit and an elongated flexible shaft having a first end thereof operatively connected to a motor disposed within the central suction unit for rotation thereby, and having a second end thereof operatively connected to the brush for rotation thereof by the motor, said shaft passing through the flexible conduit.

2. An apparatus as in claim 1, wherein said brush is a cylindrical brush comprising a rigid inner core having a plurality of feathers affixed thereto.

3. An apparatus as in claim 2, wherein said feathers are ratite feathers.

4. An apparatus as in claim 1, wherein said brush is approximately 5–72 inches in length and approximately 5–24 inches in width.

5. An apparatus as in claim 1, wherein said brush is adapted to generate a static electrical charge in use so as to attract and retain dust particles thereupon and said housing further includes an ion generator associated therewith and adapted to discharge the static electrical charge from the brust so as to facilitate the release of dust particles attracted thereto.

6. An apparatus as in claim 1, wherein the major portion of the circumference of the brush corresponds to at least 270° thereof.

7. An apparatus as in claim 1, wherein said central suction unit is adapted to operate in cooperation with the exhaust port and the flexible conduit so as to withdraw dust particles from the brush.

8. An apparatus as in claim 7, wherein said central suction unit is further adapted to collect the dust particles.

9. An apparatus as in claim 7, wherein said central suction unit includes a filter adapted to trap at least 95% of all dust particles 0.3 microns in size and larger.

10. An apparatus as in claim 1, further including a tacking head holder adapted to support the tacking head when not in use.

11. An apparatus as in claim 1, wherein said brush is a bristle brush.

12. A portable tacking unit comprising:

a tacking head including a cylindrical brush, a housing adapted to rotatably support the brush such that a major portion of the circumference of the brush is exposed and a minor portion thereof is surrounded by the housing, said housing further including an exhaust port disposed proximate the minor portion of the brush and adapted to withdraw ambient air therefrom;

a central suction unit adapted to provide a flow of air at pressure less than atmospheric and operative in conjunction with said exhaust port to withdraw and collect dust particles from the brush;

a filter associated with the central suction unit and operative to trap at least 95% of all dust particles 0.3 microns in size and larger; and a flexible conduit operatively connecting said exhaust port to the suction unit such that a low pressure flow of air is established from said exhaust port to said central suction unit.

13. An apparatus as in claim 12, wherein said housing includes drive means for rotating the brush.

14. An apparatus as in claim 13, wherein said drive means includes an electric motor.

15. An apparatus as in claim 13, wherein said drive means includes a flexible shaft.

16. A portable tacking unit comprising:

a tacking head including a cylindrical brush, a housing adapted to rotatably support the brush such that a major portion of the circumference of the brush is exposed and a minor portion thereof is surrounded by the housing, said housing further including an exhaust port disposed proximate the minor portion of the brush and adapted to withdraw ambient air therefrom;

a central suction unit adapted to provide a flow of air at pressure less than atmospheric;

a flexible conduit operatively connecting said exhaust port to the suction unit such that a low pressure flow of air is established from said exhaust port to said central suction unit; and a tacking head holder operative to support the tacking head when not in use.

17. An apparatus as in claim 16, wherein said tacking head holder is adapted to receive and surround the major portion of the circumference of the brush when the tacking head is supported therein.

* * * * *